United States Patent [19]

Moser et al.

[11] Patent Number: 4,797,780

[45] Date of Patent: Jan. 10, 1989

[54] COMPONENT WITH FILLED LAYERS AND ELECTRICAL CONTACTS AND METHODS FOR ITS PRODUCTION

[75] Inventors: Thomas Moser, Schnaittach; Klaus Otto, Nuremberg; Horst Kippenberg, Herzogenaurach, all of Fed. Rep. of Germany; Johann Ramler, Deutschlandsberg; Josef Unterlass, Graz, both of Austria

[73] Assignee: Siemens Aktiengesellschaft, Berlin & Munich, Fed. Rep. of Germany

[21] Appl. No.: 86,564

[22] Filed: Aug. 18, 1987

[30] Foreign Application Priority Data

Aug. 18, 1986 [DE] Fed. Rep. of Germany ....... 3627938

[51] Int. Cl.⁴ .................... H01G 4/10; H01G 7/00; H01G 1/14
[52] U.S. Cl. .................... 361/321; 29/25.42; 361/309
[58] Field of Search ............... 361/320, 321, 308, 309, 361/310; 29/25.42

[56] References Cited

U.S. PATENT DOCUMENTS

| | | | |
|---|---|---|---|
| 3,879,645 | 4/1975 | Rutt et al. | 361/321 |
| 4,353,957 | 10/1982 | Rutt et al. | 428/292 |
| 4,584,629 | 4/1986 | Garcia et al. | 361/321 |
| 4,604,676 | 8/1986 | Senda et al. | 361/309 |
| 4,618,912 | 10/1986 | Sakabe et al. | 361/309 |
| 4,652,967 | 3/1987 | Sakabe et al. | 361/309 |

FOREIGN PATENT DOCUMENTS

| | | |
|---|---|---|
| 0092912 | 11/1983 | European Pat. Off. . |
| 2462007 | 6/1975 | Fed. Rep. of Germany . |
| 2104291 | 3/1983 | United Kingdom . |

*Primary Examiner*—Donald A. Griffin
*Attorney, Agent, or Firm*—Kenyon & Kenyon

[57] ABSTRACT

The invention relates to a filled layer component made out of monolithic ceramic, in particular a capacitor, having a ceramic layer structure of dense and porous layers which is impregnated with a metallic material and is provided with contacts on the outer faces. According to the invention, the contacts have at least on their surfaces enrichments with constituents which form with the material of the contacts one or more intermetallic compounds which are largely insoluble in the impregnating material. These enrichments can be applied in a first manufacturing method before the impregnation process, or in another manufacturing method during the impregnation process.

11 Claims, 1 Drawing Sheet

COMPONENT WITH FILLED LAYERS AND ELECTRICAL CONTACTS AND METHODS FOR ITS PRODUCTION

FIELD OF THE INVENTION

The invention relates to a filled layer component made out of a monolithic ceramic and having improved electrical contacts and particularly a capacitor, and to methods for the production of such a ceramic.

BACKGROUND OF THE INVENTION

In the production of a filler layer component, and specifically of a filler layer capacitor, one normally starts with a sintered ceramic base element which is composed of dense and porous zones, e.g. alternating layers, and the porous zones of which are impregnated in a separate process step with a liquid metal or metal alloy. The ceramic elements required for this process are known in the art and may be produced according to German Patent DE-PS No. 24 62 007 or U.S. Pat. Nos. 3,879,645 and 4,353,957, which are incorporated herein by reference.

In the interest of a low process temperature, metals of low melting point, as e.g. lead and/or lead alloys, are preferred as the impregnating material. Due to the generally unfavorable wetting tensions between ceramic and impregnating material on the one hand, and the generally low height dimensions of the porous zones to be impregnated (e.g. 2 to 10 microns), on the other, pressure must be applied in the impregnating process. Such manufacturing methods are well known in the art.

In using the filler layer component as a capacitor, contacts of a suitable metallic material are applied to the ceramic body at the points of transfer of the impregnating metal. As a rule, silver based materials are chosen for this. If prior to the impregnation process these contacts are fired onto the ceramic surface, equally passable porosities must be provided which will prevent bleeding of the liquid impregnating material from the porous zones of the ceramic body when it is extracted from the impregnating bath. The reason for this is the tendency of conventional impregnating materials to form a partial alloy with the silver based material of the contacts, or at the least, result in a good wetting between the two materials. Alloy formation after a preceding dissolution reaction is desirable, however, to ensure a satisfactory passage of electric current, i.e. to ensure good bonding between the metallic filler in the porous zones and the contacts.

The dissolution reaction, however, has the disadvantage that during the pressure impregnation process the contacts are caused by the impregnating bath to undergo incipient dissolution to an impermissibly high degree and in the worst case are even almost detached.

In Great Britain Patent GB-A-No. 2104291, an aluminum containing glass frit is fired onto the ceramic body for the filler layer component before impregnation. While such a layer is resistant to the impregnating bath, it cannot be soldered, making it necessary to apply additional solderable layers on the first layer in subsequent operations.

In U.S. pat. No. 4,450,502 it is further proposed to apply on the ceramic body comprising silver or silver alloy and a glass frit, an external termination which is fired in and then coated with silver sulfide by a heat treatment at 350° C. to 400° C. with sulfur vapor or hydrogen sulfide vapor. Detachment of the silver layer from the ceramic body would thereby be avoided.

Thus, in the latter described process, additional steps must be carried out, and the substances used are highly toxic. During production of the terminations nascent hydrogen forms, which reduces the ceramic materials and may result in a worsening of the dielectric properties of the ceramic body.

It is, therefore, an object of the present invention to provide a structure and composition for the contacts so as to provide a good electrical bond to the metallic filler as well as ensuring resistance to detachment during the impregnating bath, and particularly in a lead or lead alloy bath.

SUMMARY OF THE INVENTION

According to the invention, this and other objects are achieved by an electronic component made out of a monolithic ceramic having alloyed electrical contacts. The component has a ceramic body containing dense and porous layers whch are impregnated by a filler layer component. The electrical contacts on the outer faces of the body contain enrichments of elemental constituents alloyed with the main elemental substance making up the contact. The alloyed constituents and substance form at least one intermetallic compound that is largely insoluble in the filler layer. The contacts preferably are made of gold, silver and/or copper and the enriching constituents preferably are made of indium, gallium and/or thallium.

In the invention, the contacts are advantageously formed on a silver basis. Alternatively, the contacts may be formed by gold or copper layers, and in particular copper together with silver may be suitable. On their free faces, i.e. on the outer sides, the contacts have enrichments (concentrations) of constituents from respective alloys. Preferably, the enrichment may be formed as a cover layer. Specifically, the enrichments may be intermetallic silver-indium compounds, which have, for example, the stoichiometric compositions $AgIn_2$, $Ag_2In$ or $Ag_3In$. Instead of indium or in combination with indium, gallium may be used as the constituent for the enrichments.

In a first manufacturing process for the filled layer component according to the invention, the contacts with the enrichments are applied on the ceramic layer structure before the impregnation process. Alternatively, in a second manufacturing process, the contacts with the enrichments may be applied during the impregnation process. In the latter case, in particular, lead indium alloys are used as impregnating material, with the impregnating material possibly containing also silver and other metallic additions.

Further details and advantages of the invention will be evident from the following figure description of embodiment examples with reference to the drawing.

BRIEF DESCRIPTION OF THE DRAWINGS

In the figures, identical parts are given the same reference symbols. The figures are described below in part jointly.

DETAILED DESCRIPTION OF THE INVENTION

In each of the figures, a cutout from a filled layer component 1 is shown, disclosing a layer structure consisting of alternately dense and porous layers 2. If the porous layers are filled with metals and if the side faces of the component 1 are provided with metallic layers as contacts, capacitors can be realized due to the dielectric properties of the ceramic. To this end, the porous layers 2 must be filled with an impregnating material in a suitable manner. This is done in a manner known in the art, specifically, by pressure or centrifugal, preferably using lead materials.

Figure 1:
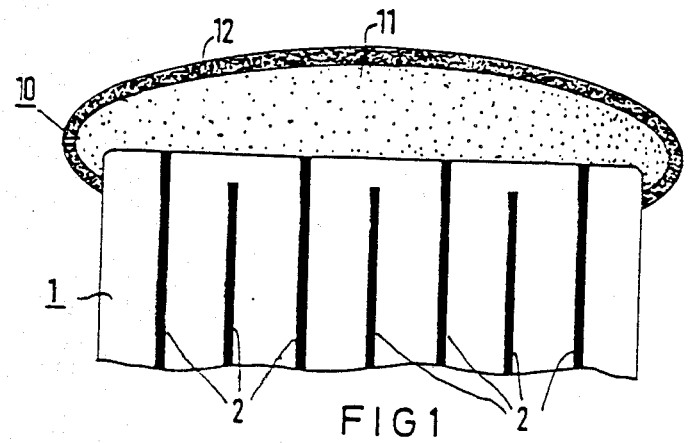
FIGS. 1 to 3 are fragmentary sectional views of monolithic ceramic components in accordance with three embodiments of the present invention.

In FIG. 1, a contact 10 is applied on component 1 as an outer electrode. The contact 10 consists of a cap 11 of porous silver, which by alloy formation is firmly bound to the lead to form an impregnating material for the filler of the porous layers 2. On the outside of the silver cap 11 a porous cover layer 12 of intermetallic silver indium compounds is applied, and in particular those having stoichiometric compositions $AgIn_2$, $Ag_2In$ or $Ag_3In$.

The contacts 10 are applied before the actual impregnation process by coating the ceramic body 1 twice. In a first coating operation, the silver cap 11 is produced, and in a second coating operation, the respective cover layer 12 of the silver indium compounds is produced. Producing such layers can be done in a simple manner by immersion in a liquid silver bath or in other respective metal solutions. In particular, a solution on a silver basis with 2 to 15% by weight indium has proven suitable. Also, a gallium compound may be present, which may have a content as high as 20%. The outside contacts 10, i.e. electrodes, thus produced have microporosities, so that the component 1 with the contacts 10 can be subjected to a pressure impregnation process.

During pressure impregnation with a lead alloy, for example, the contact 10 is largely protected against incipient dissolution by the Ag-In boundary layer 12. On the other hand, during pressure impregnation and simultaneous or subsequent heat treatment, alloy formation occurs between the impregnating material and the silver cap 11 of contact 10. Thus a sufficient eletrical bond from contact 10 to the inner lead filled porous layers 2 is achieved.

Figure 2:
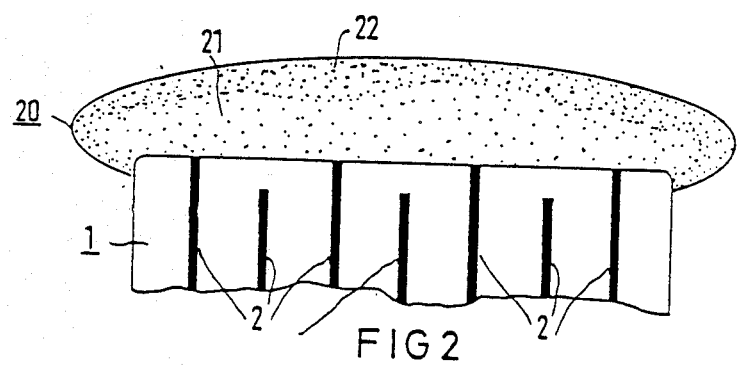

In FIG. 2, a pure, porous silver cap contact 20 is applied on component 1. These components are subjected to a pressure impregnation process, indium being added to the liquid impregnating material, i.e. the lead base melt. In the manner of filtering, the indium reacts with the silver particularly in the outer region 22 of contact 20, forming therein intermetallic phases, while in the region 21 of contact 20 primarily pure silver remains. In contrast to the embodiment according to FIG. 1, the regions are not clearly separated as distinct layers.

Figure 3:
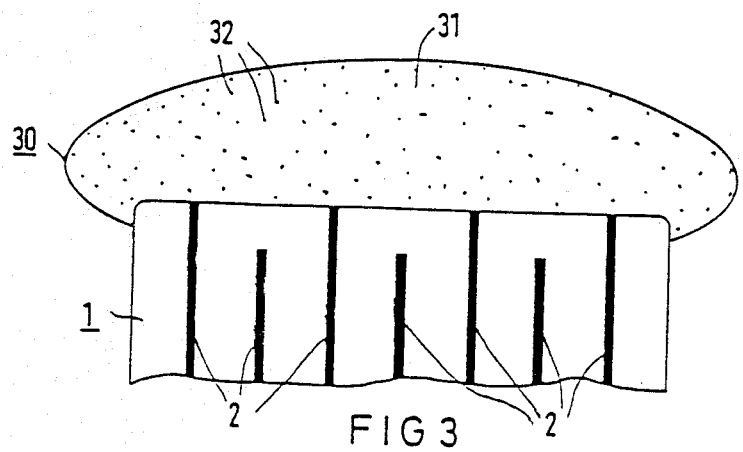

In FIG. 3, a component 1 is provided with a cap contact 30 of primarily homogeneous material. The material consists here of intermetallic silver indium compounds with an excess of silver. For this there is used in conventional manner a commercial silver indium paste which is mixed with a silver additive. Coating is accomplished, for example, by immersion and subsequent firing. Thus there results in the contact 30 a silver matrix 31 with a random distribution of fine silver indium particles 32.

Instead of applying the contacts by means of metallization pastes, coating by vapor deposition methods, e.g. sputtering, can be carried out.

In the described embodiments the enrichments in silver indium constituents provides sufficient resistance to detachment of the contacts during the actual impregnation process and at the same time an electrical bond is obtained during the impregnation or alternatively by heat treatment after the impregnation of an alloy to form a bond between the impregnating material and the material of the contacts.

Equally ood results are obtained when the contacts consist, instead of silver, of another metal of the first subgroup of the Periodic Table, e.g. gold, copper, and when other elements of the third subgroup of the Periodic Table are used instead of indium, e.g. gallium, etc. A crucial factor here is the formation of the intermetallic phases, which must be largely resistent in particular to lead as impregnating material as well as soluble in the material of the contacts.

What is claimed is:

1. component with filled layers, comprising: a ceramic body of dense and porous layers impregnated by a metal or an alloy impregnating material and having electrical contacts on its outer faces, wherein the contacts contain enrichments of elemental constituents which alloy with the main elemental substance of the contacts to form at least one intermetallic compound which is largely insoluble in the impregnating material, said elemental constituents comprising at least one element selected from the group consisting of indium, gallium and thallium.

2. A component of claim 1, wherein the enrichments form a cover layer on the contacts.

3. A component of claim 1, wherein the contact substance comprises at least one element selected from the group consisting of gold, silver and copper.

4. A component of claim 3, wherein the contacts consist essentially of silver and the enrichments contain indium as constituents, and wherein at least one intermetallic silver indium compound is present having a stoichiometric composition selected from the group of $AgIn_2$, $Ag_2In$ or $Ag_3In$.

5. A method for the production of a component according to claim 1 comprising: preparing a ceramic body of dense and porous layers, coating the outer surfaces of the ceramic body twice in succession with a main elemental substance to form electrical contacts, wherein at least the second coating comprises a solution having metal constituents based on silver with additional amounts up to about 20% by weight of indium and/or gallium and the balance silver, enriching the contacts to form at least one intermetallic compound therein, and thereafter impregnating the ceramic body with a liquid metallic material.

6. A method for the production of a component according to claim 1 comprising: preparing a ceramic body of dense and porous layers which has on its outer surfaces porous electrical contacts, and simultaneously impregnating the ceramic body with a liquid lead-indium alloy with an indium content between 2 and 20% by weight and alloying the contacts with enrichments as the impregnation process proceeds.

7. The method of claim 6, wherein the indium content of the lead-indium alloy is 5% by weight.

8. The method according to claim 6, wherein the contacts consist essentially of silver, and the impregnating material is a lead-indium alloy which additionally contains silver, and wherein silver and indium are present as an intermetallic compound at least in part.

9. The method for the production of a component according to claim 8, wherein the silver content of the impregnating material is up to 20% by weight.

10. The method according to claim 6, 7, 8 or 9 wherein the indium is partially replaced by gallium.

11. The method as in any one of claims 6, 7 or 8, wherein the indium is replaced partly by tin.

* * * * *